(12) United States Patent
Bartel

(10) Patent No.: US 6,874,308 B1
(45) Date of Patent: Apr. 5, 2005

(54) TILTING DECK LAWN MOWER

(75) Inventor: Harlan J. Bartel, Newton, KS (US)

(73) Assignee: Excel Industries, Inc., Hesston, KS (US)

( * ) Notice: Subject to any disclaimer, the term of this patent is extended or adjusted under 35 U.S.C. 154(b) by 0 days.

(21) Appl. No.: 10/621,681

(22) Filed: Jul. 16, 2003

(51) Int. Cl.$^7$ ............................................. A01D 34/03
(52) U.S. Cl. ..................................................... 56/16.2
(58) Field of Search ............................ 56/14.7, 14.9, 56/15.9, 16.2, 16.7, DIG. 14, DIG. 22

(56) References Cited

U.S. PATENT DOCUMENTS

| | | | | |
|---|---|---|---|---|
| 2,566,144 A | * | 8/1951 | Thomas | 56/10.9 |
| 2,665,621 A | * | 1/1954 | Smith et al. | 172/78 |
| 3,667,200 A | * | 6/1972 | Pool et al. | 56/328.1 |
| 3,777,459 A | * | 12/1973 | Elliott | 56/15.3 |
| 4,622,806 A | * | 11/1986 | Bahnman et al. | 56/16.2 |
| 4,869,054 A | * | 9/1989 | Hostetler et al. | 56/6 |
| 5,704,201 A | * | 1/1998 | Van Vleet | 56/14.9 |
| 5,826,414 A | * | 10/1998 | Lenczuk | 56/14.7 |
| 6,434,919 B2 | * | 8/2002 | Schick | 56/15.9 |
| 6,675,564 B1 | * | 1/2004 | Ward | 56/10.4 |

* cited by examiner

Primary Examiner—Robert E. Pezzuto
Assistant Examiner—Nathan Mammen
(74) Attorney, Agent, or Firm—Edward L. Brown, Jr.

(57) ABSTRACT

A tilting deck lawn mower including a tractor frame, with drive wheel hydrostatic steering supporting a carrier frame and cutting deck pivotally mounted to the tractor frame on a horizontal axis parallel to the path of movement of the mower. Supported by the carrier frame is a single cutting deck with multiple blades; a pair of castered wheels mounted on the carrier frame, one on each side for ground support; a horizontal leg supporting one of the wheels is pivotally journaled to the carrier frame; a parallelogram linkage connecting the rotation of the supporting leg to the tractor, whereby the supporting leg does not rotate relative to the ground when the carrier frame rotates and an adjustable supporting arms on the carrier frame supporting the cutting deck which arms lift the cutting deck up towards the carrier frame as the carrier frame and cutting deck begin the rotate.

6 Claims, 5 Drawing Sheets

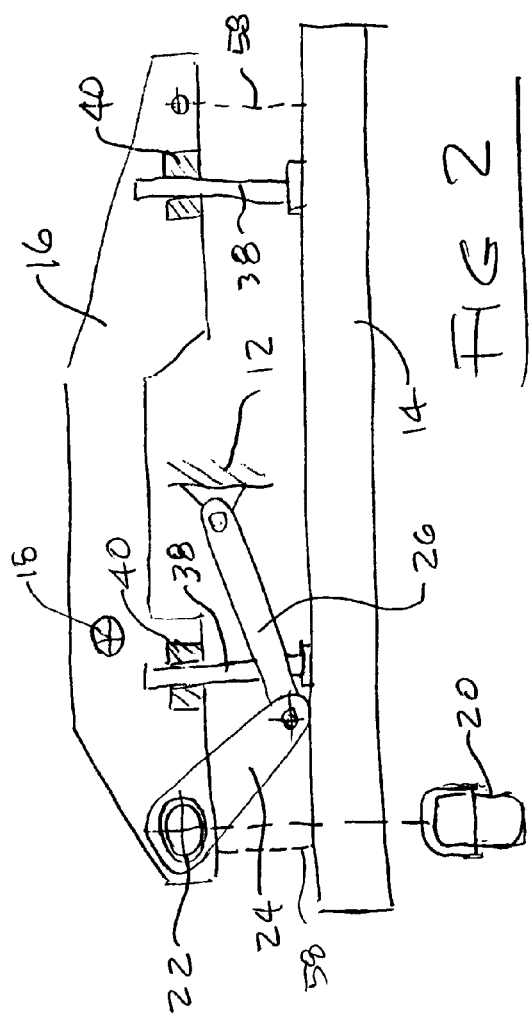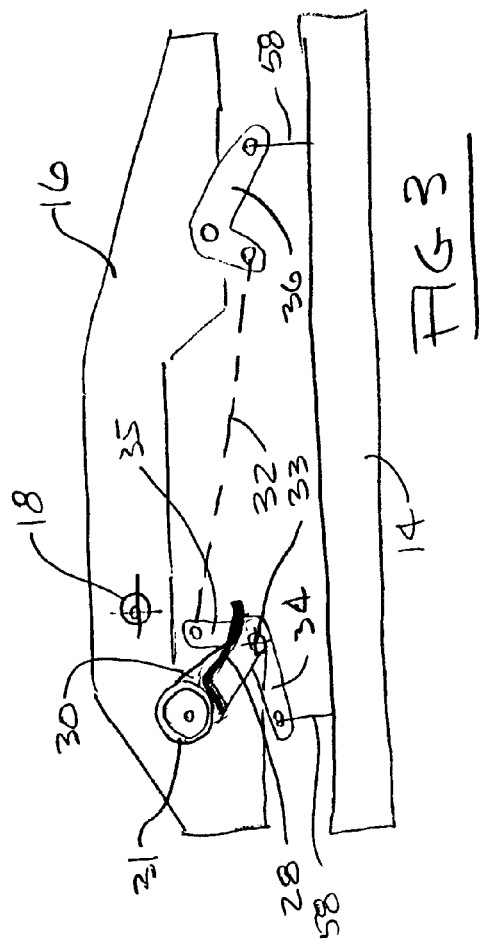

TILTING DECK LAWN MOWER

BACKGROUND OF THE INVENTION

This invention relates to lawn mowers and more particularly to commercial mowers with multiple-blade wide decks, which can be tilted vertical for passage through limited space areas.

Commercial lawn mowers like farm tillage equipment are always attempting to achieve a wider cutting swath as for example, some farm tillage implements when in use are substantially wider than the roads they utilize for transport. To achieve this narrower transport width, a variety of different designs have been used in the prior art. Farm implements typically fold-up sections of the tillage implement upon themselves during transport. The same concepts are used in grass mowing equipment to a lesser scale as typified in U.S. Pat. No. 3,473,302 to Caldwell which illustrates a series of deck sections which fold up during transport while leaving a center section of the deck in place. Also see U.S. Pat. No. 5,249,411 to Hake, with a similar deck design.

The present invention is specifically directed to a walk-behind commercial unit having a four blade single deck design. In walk-behind mowers and smaller riding mowers, the typical way to reduce deck width for passage through gates and limited spaces is to hinge one section of the deck so that it may be tilted to a vertical position such as that taught in U.S. Pat. No. 6,308,503 to Scag. Other variations of partial tilting sections are widely used as for example U.S. Pat. No. 5,463,853 to Santoli et al.

The only patent discovered that tilts the entire deck in one piece, is U.S. Pat. No. 4,779,406 to Schroeder, which tilts the deck about a lateral axis so that the underside of the deck is accessible for maintenance and cleaning which has no impact on deck width.

SUMMARY OF THE INVENTION

The present invention effectively tilts a multiple-blade single deck to a vertical position that effectively renders the mower no wider than the drive wheels on the tractor portion of the mower. The mower deck is supported from a carrier frame which is pivotally connected to the tractor frame about a horizontal longitudinal extending axis which when fully elevated, basically stands the carrier frame and deck on end. Since the pivot point for the rotation of the carrier frame and deck is not positioned on the outer edge of the carrier frame, it is necessary to lift the deck with respect to the carrier frame as the carrier frame commences its rotation so that the lower edge of the deck does not drag on the ground. This deck lifting relative to the carrier frame is caused by a deck lift crank, that carries a cam roller on the end thereof engaging a camming surface through a series of lift arms and links which draws the deck upward in close proximity to the carrier frame so as to clear the ground as the carrier frame and deck begin their tilting action. A similar linkage also lifts the grass deflection chute when the deck approaches the vertical position.

The walk-behind mower unit is of a standard configuration utilizing two drive wheels on the tractor frame which are each driven by a separate hydrostat pump and motor at different speeds so as to achieve steering, while a pair of caster wheels are positioned on the front of the mower which provide the necessary four wheel support for positioning the mower relative to the ground surface. When rotating the carrier frame and deck upward, the outer caster wheel of course is lifted off the ground leaving the inner caster wheel in engagement with the ground which is necessary for supporting the mower on at least three wheels. The inner caster wheel is mounted on a support rod that is journaled within the carrier frame so that it rotates relative to the carrier frame. This caster wheel support rod is connected to a parallelogram linkage with one pivot point on the linkage connected to the stationary tractor frame so that as the deck and carrier frame are rotated upward, the caster wheel support rod does not rotate and it remains properly aligned with the ground so that the overall mower is supported with the deck in the fully elevated position. This permits the mower to be driven in a three-wheel transport configuration or in a typical moving configuration.

Therefore, its principal object of the invention is to provide a wide-cut mower that can be driven under its own power through narrow gate areas.

A further object of the present invention is to provide a walk-behind mower that can be driven on a three-wheel configuration with the cutting deck fully elevated in a vertical position.

Another object of the present invention is to provide a tilting deck walk-behind mower which can be readily unlatched in a matter of seconds and lowered to its operating configuration with a very minimal time loss between its transport folded position and its operative position.

BRIEF DESCRIPTION OF THE DRAWINGS

FIG. 2 is a front elevational view of the carrier frame and cutting deck in symbolical form illustrating the parallelogram linkage for maintaining the caster wheel support shaft in a ground engaging position as the carrier frame and deck are rotated;

FIG. 3 is a front elevational view of the linkage for lifting the deck relative to the carrier frame also symbolically shown;

DESCRIPTION OF THE PREFERRED EMBODIMENTS

Present invention is directed to a self-propelled walk-behind lawn mower having a mower deck supported by a carrier frame which is fully rotatable to a vertical non-operating position so that the mower can travel through narrow gates and passageways to an enclosed mowing area in a three-wheel configuration.

Figure 1:
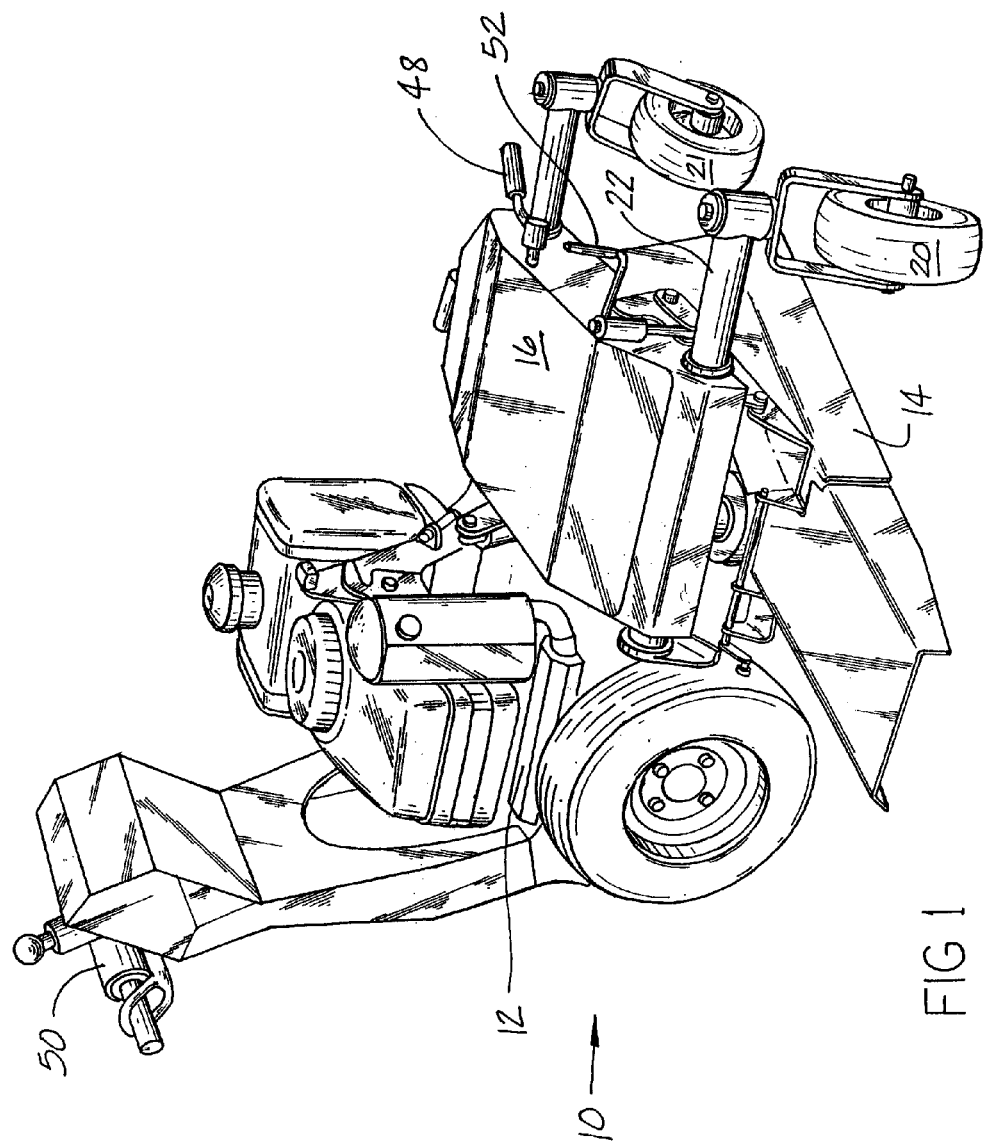
FIG. 1 is a perspective view of a self-propelled walk-behind mower having a mowing deck positioned in its horizontal operating position.

Referring to FIG. 1, a walk-behind self-propelled lawnmower is generally described by reference numeral 10 in accordance with the preferred embodiment of the present invention. The tractor portion of the mower 10 is mounted on frame 12 and is of the conventional drive wheel steering type of unit well known in the prior art wherein each of the two drive wheels is separately driven by a variable flow pump and motor from a common power source. The steering handles 50 control the speed of the two separate drive wheels thus creating the steering while the front caster wheels 20 and 21 merely support the front of the mower 10. These types of hydrostatic units can also be zero turn radius units if desired wherein one drive wheel can rotate forward while the other rotates backward at the same speed, thus causing the mower to turn about a central axis of the tractor. The details of the drive system and steering control are not shown in detail and are well known in the prior art in various forms. The mower deck 14 is supported by a carrier frame 16 which is pivotally connected to the tractor frame 12 about a horizontal longitudinal axis 18 as shown in FIGS. 2 and 3 which axis is parallel to the direction of travel of the mower. The deck 14 is connected to the carrier frame 16 as shown in FIGS. 2 and 3 by chain 58. Deck 14 can be moved relative to carrier frame 16 by two means, the first being a manual crank 52 as shown in FIG. 1 and the second being a cam actuated deck lift linkage that is shown in FIG. 3. Manual crank 52 is used to set the specific grass cutting height of the mower when in use. The cam operated deck lift linkage in FIG. 3 can override the manual hand crank 52 setting.

In viewing FIG. 3, the cam operated deck lift linkage is shown in symbolic form. The carrier frame 16 and deck 14 are of both rotatably mounted about pivot 18, which mounts to the tractor frame. The arcuate cam surface 28 is followed by a cam roller 31 which in turn, is mounted on a crank 30 which rotates about axis 33. Also integral with crank 30 are a pair of arms 34 and 35 which lift deck 14. Actuating rod 32 connecting arm 35 to arm 36 causes both sides of deck 14 to lift at the same rate. Cam 28 which is mounted on the tractor frame 12 is stationary so that as the carrier frame begins to rotate in a counter-clockwise direction, cam roller 31 will be forced to ride up over the hump 29 in cam surface 28. This will cause crank 30 to rotate in a clockwise direction about axis 33, thus raising deck 14 up towards carrier frame 16. Once the cam follower 31 passes the hump on the cam, the remaining cam surface is concentric with the rotational axis 18 thus holding the deck in its elevated position as illustrated in detail in FIGS. 5 and 6.

As the carrier frame 16 and deck 14 begin to rotate upward, caster wheel 21 comes out of contact with the ground and no longer functions. Caster wheel 20 is mounted on support rod 22, and in turn is journaled in carrier frame 16. Located on the rear end of rod 22 is a fixed link 24 as shown in FIG. 2, which is pivotally connected to a parallel link 26 which in turn is pivotally connected to the stationary tractor frame 12.

Figure 4:
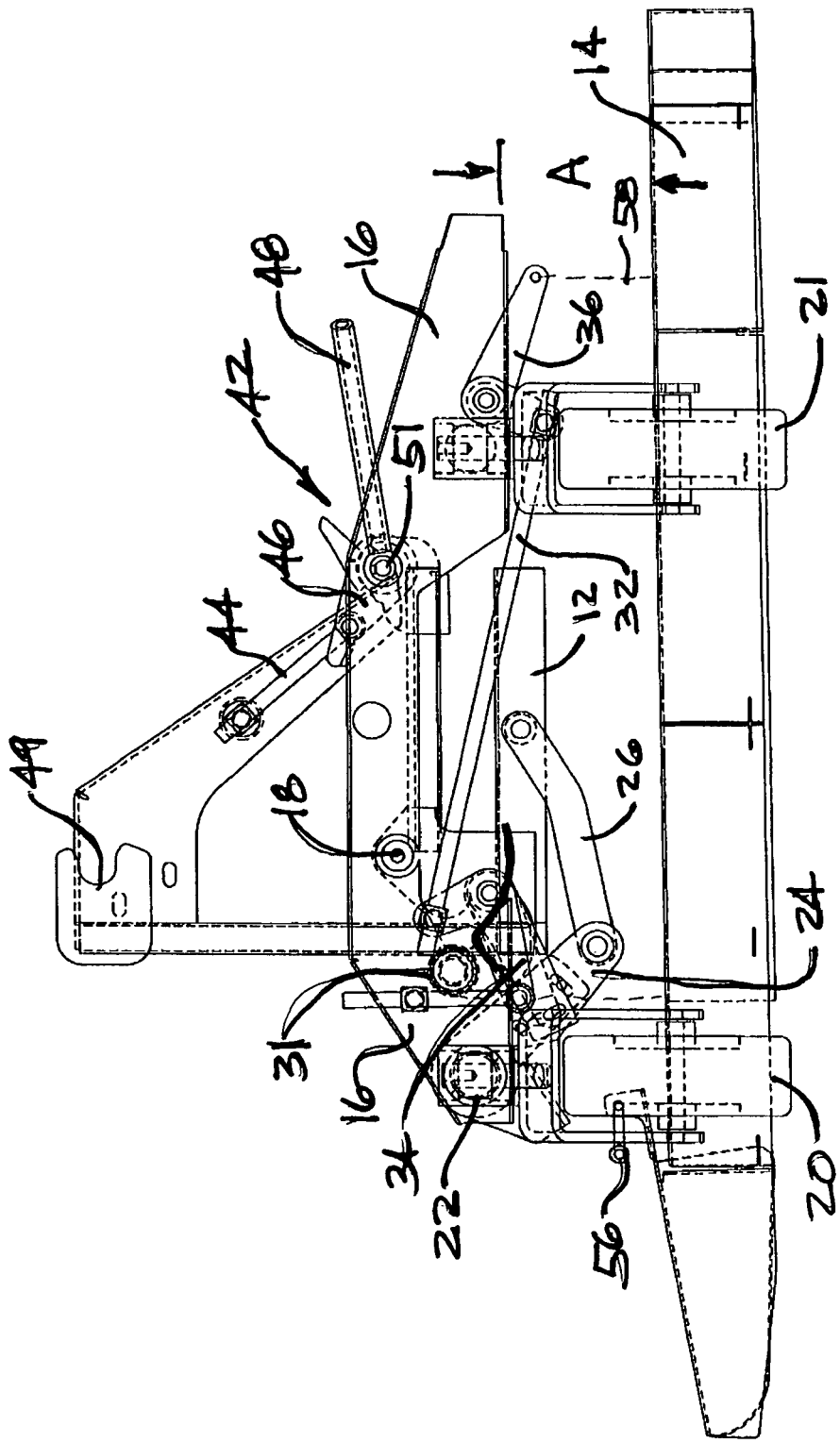
FIG. 4 is a front elevational view of the carrier frame and deck and the respective linkages with the deck in the horizontal working position.
Figure 6:
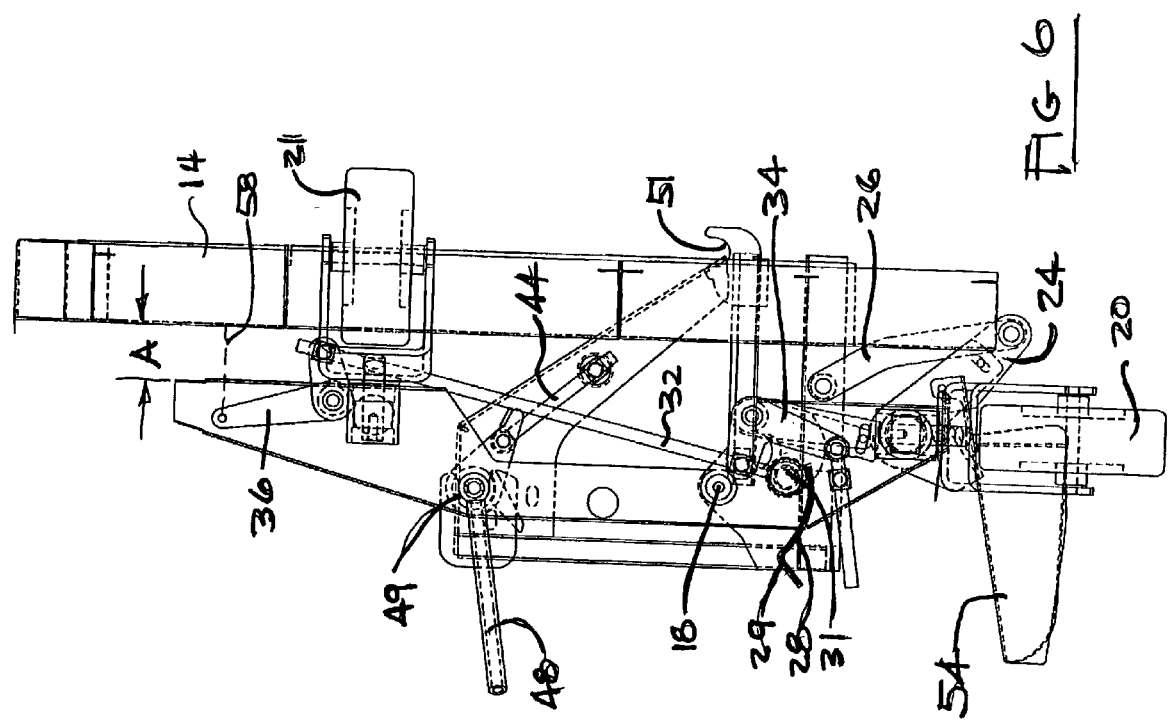
FIG. 6 is a front elevational view similar to FIG. 4 with the carrier frame and deck in the fully elevated 90° tilt position.

In viewing FIG. 2, as the carrier frame 16 and deck 14 begin to rotate counter-clockwise about pivot 18, the parallelogram linkage 24 and 26 causes caster support rod 24 to remain in its non-rotating position as shown in FIG. 2, even though the carrier frame and deck are rotating upward in a counter-clockwise direction. Rigid shafts 38 mounted on deck 14 as seen in FIG. 2 are slidably received in bushings 40, thus preventing any lateral movement between carrier frame 16 and deck 14. Caster wheel 20 remains in contact with the ground as the carrier frame and deck rotate by reason of the parallelogram linkage previously discussed. FIG. 4 illustrates the deck 14 in its operative position with both caster wheels 20 and 21 supported on the ground. Locking latch mechanism 42 holds the carrier frame in its horizontal operating position. Latch handle 48 is pulled upward in a counter-clockwise direction thus forcing link 46 over a dead center position with link 44, thereby releasing carrier frame 16 for rotation about axis 18. When deck 14 is fully tilted to its vertical position as seen in FIG. 6, hook 49 mounted on the tractor frame is engaged by locking latch 42 through clockwise rotation of handle 48 as seen FIG. 6, thereby locking deck 14 in its elevated position. In comparing FIG. 4 with FIG. 6, the change in distance A between the carrier frame 16 and deck 14 is readily apparent since cam roller 31 is held up by the concentric portion of cam 28 as seen in FIG. 6.

Figure 5:
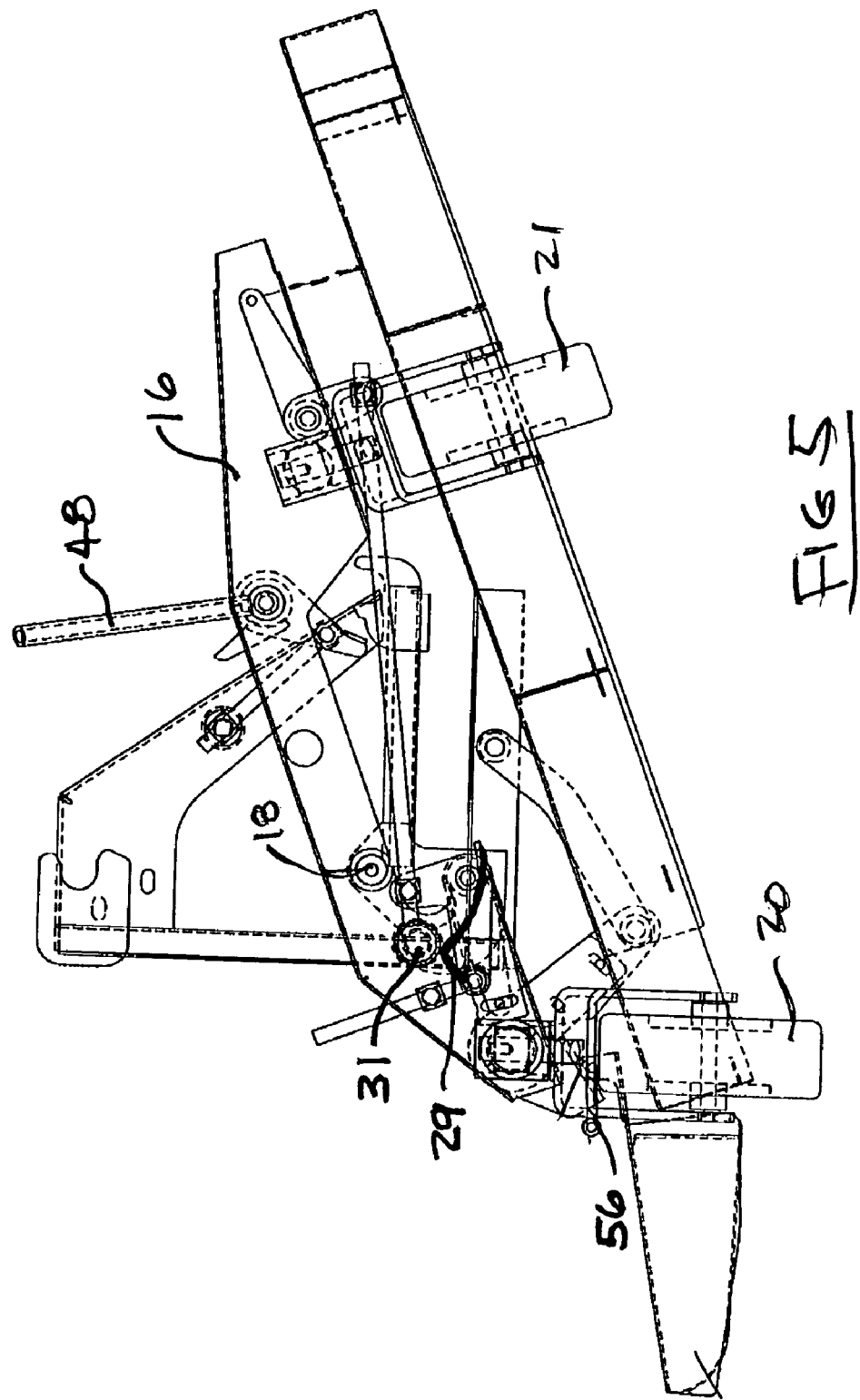
FIG. 5 is a similar front elevational view to FIG. 4 with the deck elevated at 20° illustrating the positions of the various linkages and cams.

When lowering the deck 14 back to its horizontal working position, as the deck and carrier frame swing through the 20° tilted position of FIG. 5, cam roller 31 rides over hump 29 on the cam surface, thus allowing the deck to drop down to its operative position as seen in FIG. 4.

While the invention as been described with reference to the preferred embodiments those skilled in the art will appreciate the certain substitutions, alterations, and admissions may be made without departing from the spirit of the invention. Accordingly, the foregoing description is meant to be exemplary only and should not limit the scope of the invention set forth in the following claims.

I claim:

1. A lawn mower which tilts its cutting deck from a horizontal position to a vertical transport position comprising:

a tractor frame including a power source, drive wheels driven by the power source and steering means;

a carrier frame pivotally mounted to the tractor frame on a horizontal axis parallel to the path of movement of the mower;

a single cutting deck including multiple cutting blades positioned under the carrier frame and supported therefrom;

a pair of castered wheels mounted on the carrier frame, one on each side for ground support;

a horizontal leg supporting one of said wheels pivotally journaled to the carrier frame;

a fixed offset link rigidly attached to said leg;

a parallel link, one end pivotally attaching to the offset link with the opposite end pivotally attached to the stationary tractor frame providing a parallelogram linkage with the carrier frame and said leg whereby rotation of the carrier frame about its pivot through the parallel linkage retains the caster wheel on said leg from rotating relative to the ground as the carrier frame and deck are rotated upwards towards a vertical position; and, adjustable means supporting the cutting deck to the carrier frame which means lifts the cutting deck up towards the carrier frame as the carrier frame and cutting deck begin to rotate.

2. A lawnmower set forth in claim 1 wherein the adjustable means supporting the cutting deck comprises a stationary cam surface on the tractor frame, a crank pivotally mounted on the carrier frame supporting a cam follower which engages said cam surface, said crank having two arms, each of which when the crank is rotated lifts the cutting deck towards the carrier frame as the carrier frame is rotated from its horizontal position.

3. A lawn mower which tilts its cutting deck from a horizontal position to a vertical transport position comprising:

a tractor frame including a power source, drive wheels driven by the power source and steering means;

a carrier frame pivotally mounted to the tractor frame on a horizontal axis parallel to the path of movement of the mower;

a single cutting deck including multiple cutting blades positioned under the carrier frame and supported therefrom;

a pair of castered wheels mounted on the carrier frame, one on each side for ground support;

a horizontal leg supporting one of said wheels pivotally journaled to the carrier frame;

a parallelogram linkage connecting the rotation of the supporting leg to the tractor frame whereby the supporting leg does not rotate relative to the ground when the carrier frame rotates on its axis.

4. A lawn mower as set forth in claim 3 wherein the supporting means supporting the cutting deck under the carrier comprises an adjustable length hanger supporting the cutting deck which lifts the cutting deck up towards the carrier frame as the carrier frame and cutting deck begin to rotate from the horizontal position.

5. A lawn mower as set forth in claim 4 wherein the adjustable hanger comprises a stationary cam surface on the tractor frame, a crank pivotally mounted on the carrier frame supporting a cam follower which engages said cam surface, said crank having two arms, each of which when the crank is rotated lifts the cutting deck towards the carrier frame as the carrier frame is rotated from its horizontal position.

6. A lawn mower as set forth in claim 3 including at least one rigid shaft normally mounted on the cutting deck and at least one mating bushing mounted on the carrier frame for receipt of said shafts to maintain parallel alignment between the cutting deck and the carrier frame as they move relative to each other.

* * * * *